US011238628B2

(12) United States Patent
Mehta et al.

(10) Patent No.: US 11,238,628 B2
(45) Date of Patent: Feb. 1, 2022

(54) INTELLIGENT CONTEXT-BASED IMAGE RECOMMENDATIONS

(71) Applicant: ADOBE INC., San Jose, CA (US)

(72) Inventors: Saurabh Mehta, Noida (IN); Saurabh Gupta, Noida (IN); Sameer Bhatt, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/113,529

(22) Filed: Aug. 27, 2018

(65) Prior Publication Data
US 2020/0066014 A1 Feb. 27, 2020

(51) Int. Cl.
G06F 16/58 (2019.01)
G06T 7/00 (2017.01)
G06T 11/60 (2006.01)
G06F 16/2457 (2019.01)
G06F 3/0484 (2013.01)

(52) U.S. Cl.
CPC ........ *G06T 11/60* (2013.01); *G06F 16/24578* (2019.01); *G06F 16/5866* (2019.01); *G06F 3/04842* (2013.01); *G06T 2200/24* (2013.01); *G06T 2210/12* (2013.01)

(58) Field of Classification Search
CPC .. G06F 3/0321; G06F 17/212; G06F 16/5866; G06F 16/24578; G06F 3/04842; G06T 11/60; G06T 2200/24; G06T 2210/12; G06T 7/00
USPC ................................................ 715/202, 200
See application file for complete search history.

(56) References Cited

U.S. PATENT DOCUMENTS

| | | | |
|---|---|---|---|
| 7,028,255 B1 * | 4/2006 | Ayers | G06Q 10/10 715/202 |
| 7,178,101 B2 * | 2/2007 | Tunning | G06F 17/2247 715/236 |
| 8,254,684 B2 * | 8/2012 | Raju | G06F 16/58 382/181 |
| 8,433,140 B2 * | 4/2013 | Ke | G06K 9/6202 382/209 |
| 8,489,627 B1 * | 7/2013 | Brandt | G06F 16/9038 707/765 |
| 8,737,728 B2 * | 5/2014 | Bhardwaj | G06T 7/41 382/165 |
| 8,958,662 B1 * | 2/2015 | Grosz | H04N 21/854 382/305 |
| 9,129,161 B2 * | 9/2015 | Agosta | G06K 9/00791 |
| 2009/0313244 A1 * | 12/2009 | Sokolenko | G06F 16/951 |
| 2011/0082749 A1 * | 4/2011 | Rivlin | G06F 17/248 705/14.66 |
| 2012/0194519 A1 * | 8/2012 | Bissell | G06F 16/9577 345/428 |

(Continued)

Primary Examiner — Manglesh M Patel
(74) Attorney, Agent, or Firm — Shook, Hardy & Bacon L.L.P.

(57) ABSTRACT

Methods and systems are provided for an intelligent auto-fill process capable of smartly filling objects on a canvas using selected context-based images. Content related to the canvas is analyzed to determine context tags related to the canvas. The context tags are used to generate a media list comprised of one or more context-based image. The media list is used to automatically fill at least one object on the canvas such that a relevant part of the context-based image is visible. In this way, objects on a canvas can be automatically filled with images related to the context of the canvas.

20 Claims, 10 Drawing Sheets

(56) References Cited

U.S. PATENT DOCUMENTS

2013/0156318 A1* 6/2013 Beckman .............. G06T 11/206
  382/190

* cited by examiner

INTELLIGENT CONTEXT-BASED IMAGE RECOMMENDATIONS

BACKGROUND

Users who generate content (e.g. content designers) often wish to present the content in a manner that enhances the overall design. To this end, users can utilize objects filled with images as part of content creation, such as, to generate marketing materials, presentations, books, and so forth. By way of example, a user may input text into a document and fill the text with images. Successfully selecting and placing images into objects (e.g., text or shapes) plays a large role in the effectiveness of generated content. For instance, a slide about Paris with an object containing an image of the Eiffel Tower with only the lower half of the tower visible and an object containing an image of the London Bridge can both be characterized as unsuccessful and/or ineffective generated content.

Conventional methods for selecting and placing images into objects generally rely on a user searching images and selecting a relevant image. Thereafter, the user manually places the selected image into an object. Typically, the image is manually adjusted by the user to appropriately fit the image (e.g., adjusting width and/or height to properly fill the object, panning the image to ensure the relevant portion of the image is visible in the object, or the like). A user performs this process for each object (e.g., letter) desired to be filled by an image. Such manual implementations, however, often require a user to expend a considerable amount of time and effort, often leading to frustration and, in some cases, lower quality content or abandonment of content. Accordingly, the selection and placement of images into content is oftentimes tedious and ineffective.

SUMMARY

Embodiments of the present disclosure are directed towards a contextual image system capable of generating smartly filling objects on a canvas using intelligently selected context-based images. Such objects can include fillable text, shapes, items, etc. The context-based images can include any form of media, such as, photos, clip-art, cartoons, etc. In accordance with embodiments, such a contextual image system can fill an object with one or more context-based images in real-time upon receiving an indication to auto-fill an object. Advantageously, such a contextual image system is capable of determining the context of a canvas (e.g., document, slide, digital page, etc.) containing an object such that images selected and used to fill the object relate to that context. Further, the contextual image system can resize and/or place an image into the object such that the most important/relevant portion of the image is visible in the object. In this way, objects can be intelligently selected and used to generate smartly filled objects. As such, a user need not spend the time and effort required by conventional methods for manually selecting and placing images into objects. Thus, the contextual image system can intelligently auto-fill an object(s) on a canvas using smartly placed context-based images.

DETAILED DESCRIPTION

Figure 1A:
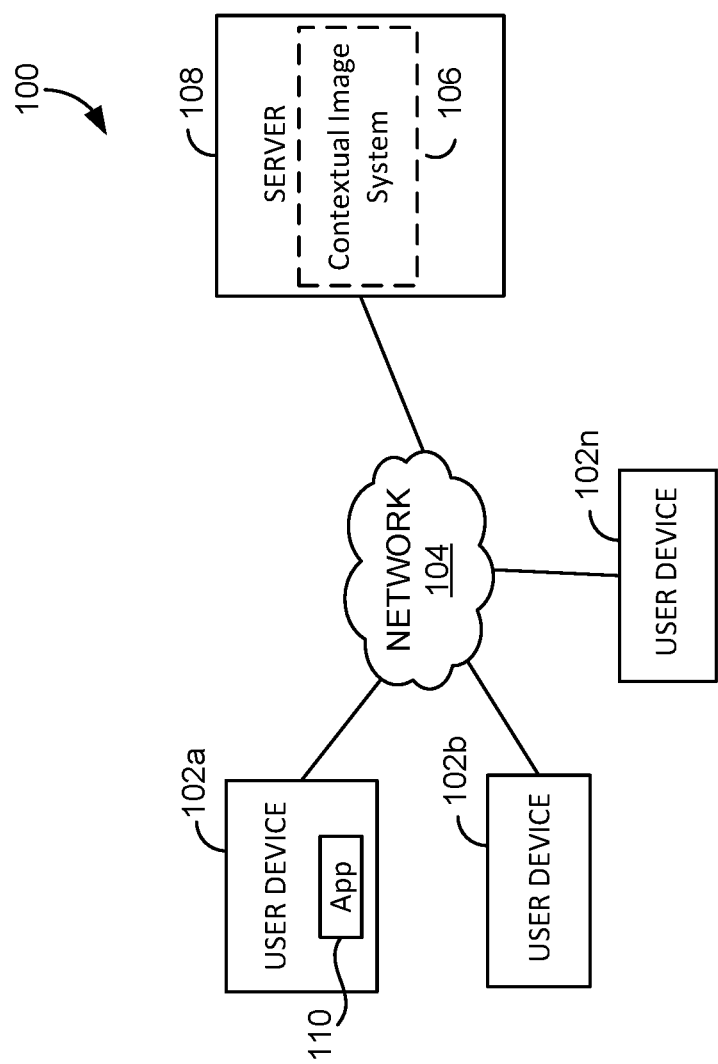
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Currently, when filling an object (e.g., text) with content (e.g., image), a user typical searches for and selects an appropriate image, places the image within the object, and then appropriately fits or positions the image within the object. Such a manual process requires a user to spend a significant amount of time and effort generating content. By way of example only, when generating new content, a new document can be created with some text. In order to fill the letters of the text with images, a user may manually rasterize the text such that each letter is individually selected and placed into its own layer. The user then searches and selects images to place within each letter of the text. To fill a letter of the text, a selected image is opened and placed within the mask of the individual letter. Upon placing the image within the mask, the image may need to be manually resized by the user to fit into the mask, as well as manipulated such that the relevant portion of the image is visible. This selection, placement, and manipulation process must be repeated for each letter of the text.

Using this conventional process to effectively select and fit images into objects is tedious and time consuming. Further, such a process may require expertise and knowledge of the use of content generation applications, resulting in many novice users unsuccessfully attempting the process. In some cases, such tediousness or unfamiliarity can lead to a user abandoning work due to frustration.

Accordingly, embodiments of the present disclosure are directed to an auto-fill process that effectively fills objects (e.g., text, shapes, or the like) on a canvas using intelligently selected context-based images. A canvas generally refers to a background onto which content is placed. A canvas can include a document, presentation slide, digital page, web page, etc. In this regard, various objects can be placed on a canvas. As used herein, an object may be any type of object capable of being filled with content, such as an image. For example, an object may be text (e.g., a letter), a shape, or the like having an area of which may be filled with an image. Objects can have a predefined boundary utilized to fill the object (e.g., fill the object with an image). Such objects can include fillable shapes, text, etc. For instance, a letter T can have the predefined boundary of the outline of the shape of the letter and inside the outline of the shape of the letter can be fillable by placing an image within the predefined boundary of the letter.

In operation, and at a high level, any number of objects can be placed on a canvas. Upon an indication (e.g., user selection) to fill an object or set of objects, the auto-fill process can identify or select an image based on the context associated with the object(s) (e.g., other content within the canvas). As described herein, context associated with the object can be determined, for instance, based on content related to a canvas (e.g., context from a background image, text on the canvas, text entered by a user, or the like). As various contexts can be identified in association with an object(s), the contexts can be analyzed and used to identify an image to place within or fill the object.

In one embodiment, upon identifying or determining a context associated with an object(s), the context can be assigned to a context category, such as, for example, background tags (e.g., tags related to a background image), face tags (e.g., names belonging to faces present in a background image and/or in text), place tags (related to a background), other tags, etc. The determined context tags can be scored based on category. For example, context tags (e.g., background tags, face tags, place tags, other tags, etc.) for a canvas can be scored based on the tag category such that more valued tags receive a higher score (e.g., face tags). These scored tags can then be used to identify media with the same/similar context (e.g., indicated via tags) to generate a unique media list that includes media (e.g., images) to fill an object(s). For example, when the scored tags indicate the most valued context tag relates to "Paris," the identified media can relate to Paris. As another example, when the scored tags indicate the most valued context tag relates to "Olivia's Birthday," the identified media can relate to Oliva, birthday cake, etc.

The media list can be used to select the appropriate number of images to fill the object(s) on the canvas. As used herein, an image may refer to any type of image, such as, photos, videos, clip-art, cartoons, etc. Although generally described herein as a still image, as can be appreciated, in some cases, an image may be a moving image.

Upon selecting an image(s) for populating the object(s) on the canvas, the image can be effectively placed. Effective or intelligent placement of the image can include automatically resizing the image based on the width and/or height of a bounding box associated with the object. Further, intelligent placement can include displaying the image in the object such that the most important/relevant area of the image is visible (e.g., placing face(s) in the image in the center of the bounding box associated with the object or, if no face is present, centering the image in the bounding box). Advantageously, images can be automatically selected and placed to fill an object thereby increasing user productivity and increasing effectiveness or relevance of the content and placement thereof.

FIG. 1 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1 is an example of one suitable operating environment. Among other components not shown, operating environment 100 includes a number of user devices, such as user devices 102*a* and 102*b* through 102*n*, network 104, and server(s) 108. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102*a* through 102*n* can be any type of computing device capable of being operated by a user. For example, in some implementations, user devices 102*a* through 102*n* are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out determining, selecting, and/or placing context-based images to effectively and efficiently fill objects on a canvas. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly. One example of such an application is Photoshop® Elements and/or Photoshop® Premiere Elements.

In accordance with embodiments herein, application 110 can facilitate auto-filling objects on a canvas with automatically selected context-based images. In particular, a user can create and/or open a canvas with content (e.g., associated text, a background, etc.). A user can select to auto-fill an object. The selection of auto-fill triggers an analysis of the context in association with the object or content of the canvas for use in selecting and placing a context-based image into the object. The application may facilitate the access of one or more images stored on the user device 102a (e.g., in a photo library), and/or import images from remote devices 102b-102n and/or applications, such as from server 108. For example, the selected image can be a picture taken using a camera on a device, for example, user device 102a. As another example, an image can be selected from a repository, for example, stored in a data store accessible by a network or stored locally at the user device 102a.

Figure 2A:
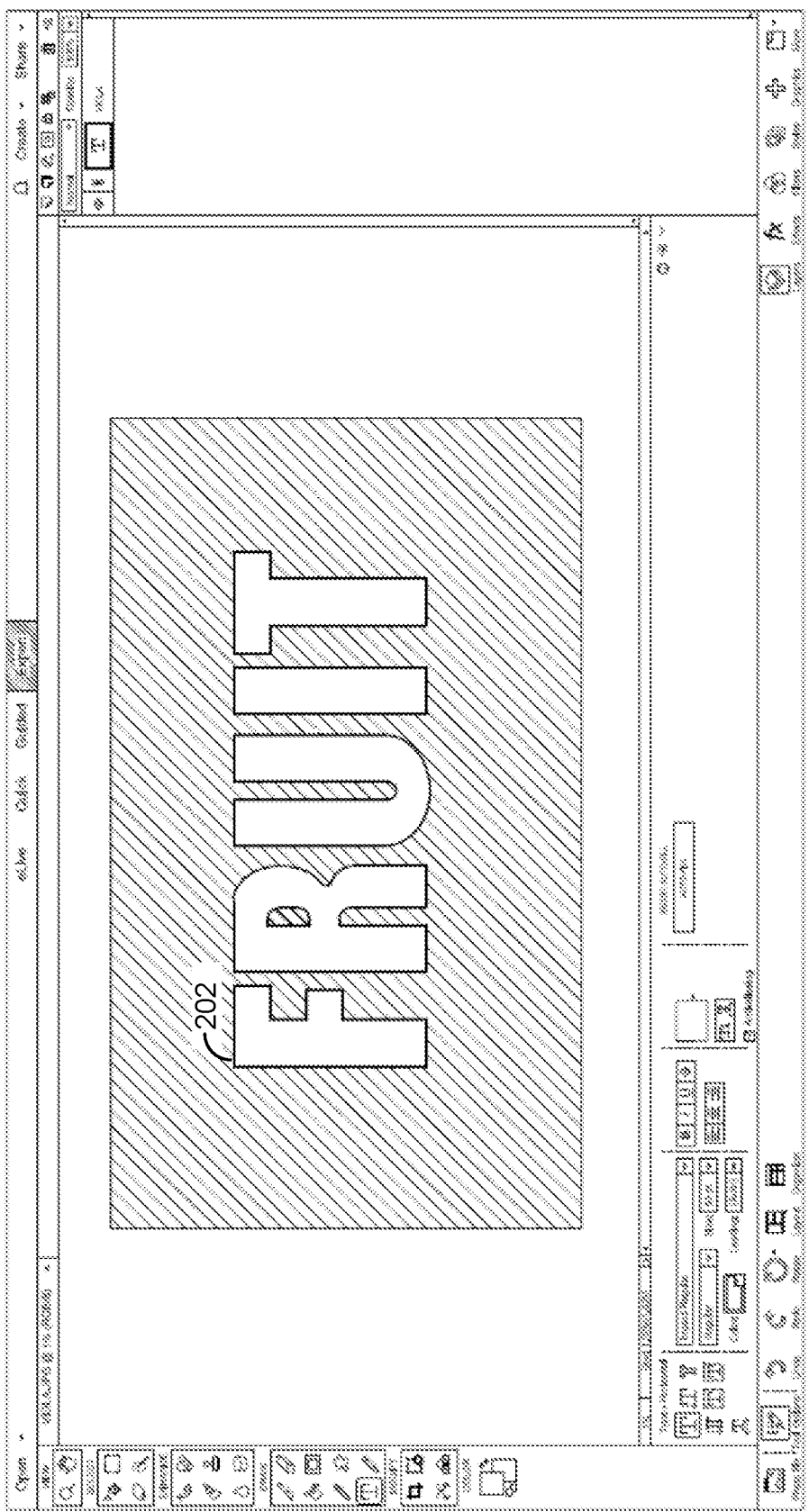
FIG. 2A depicts an example user interface in which some implementations of the present disclosure can be employed, in accordance with various embodiments.
Figure 2B:
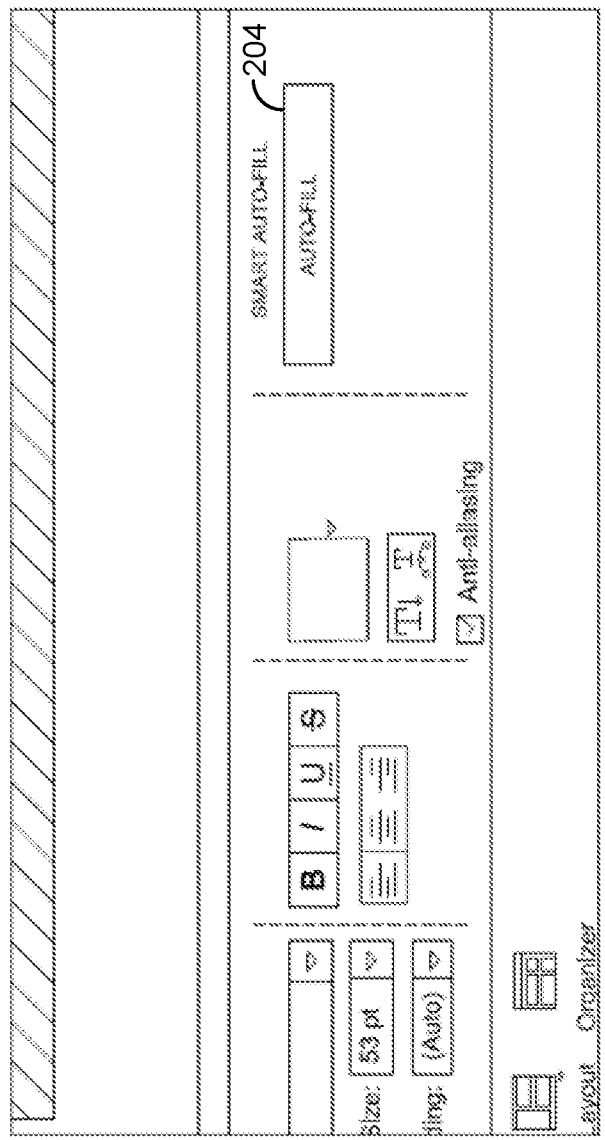
FIG. 2B depicts an example user interface in which some implementations of the present disclosure can be employed, in accordance with various embodiments.
Figure 2C:
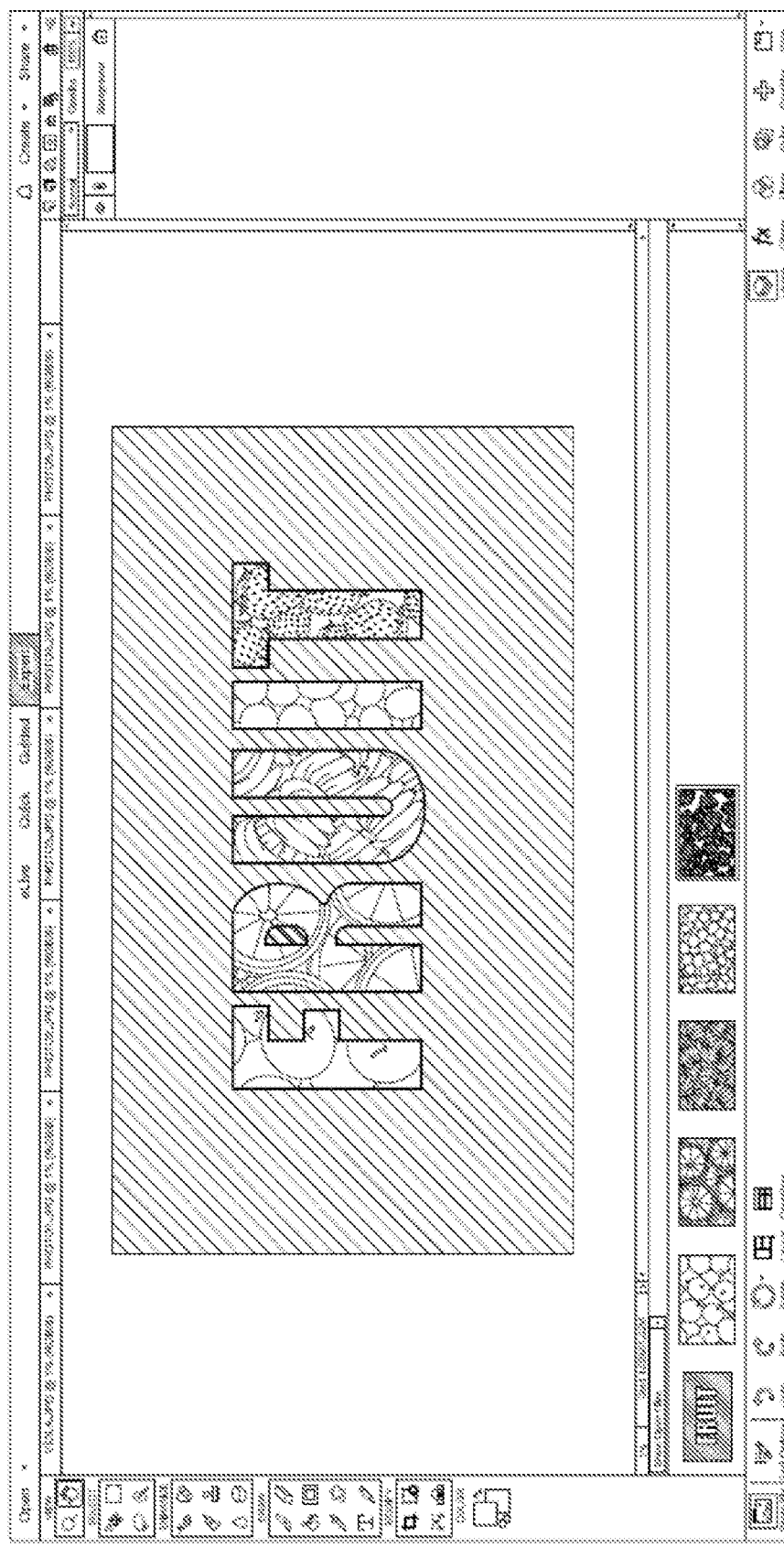
FIG. 2C depicts an example user interface in which some implementations of the present disclosure can be employed, in accordance with various embodiments.

In accordance with identifying a context-based image to fill an object, the application 110 can facilitate presentation of the object with the context-based image within the object. As can be appreciated, any number of objects on a canvas can be filled with images. Referring to FIGS. 2A-C, aspects of an illustrative user interface are shown, in accordance with various embodiments of the present disclosure. By way of example only, and with reference to FIGS. 2A-2C, assume a user inputs text (e.g., "FRUIT") that is presented on a display screen, as shown in FIG. 2A. Each letter of the text can have a predefined boundary (e.g., for the letter F, the predefined boundary is outline of the letter F 202). Now assume a user selects an option to auto-fill, for example, by selecting an auto-fill icon 204 of FIG. 2B. In an embodiment, upon selecting to auto-fill all fillable objects on the canvas can be determined (e.g., F, R, U, I, and T). In other embodiments, user-input text can be used to determine fillable objects on the canvas (e.g., FRUIT can be user-input text). In further embodiments, a user can select fillable objects to auto-fill (e.g., a user selects F, R, U, I, and T for auto-fill). As shown in FIG. 2C, the letters of the text are auto-filled, in accordance with various embodiments described herein.

As described herein, server 108 can facilitate auto-filling objects on a canvas with automatically selected context-based images, using contextual image system 106. Server 108 includes one or more processors, and one or more computer-readable media. The computer-readable media includes computer-readable instructions executable by the one or more processors. The instructions may optionally implement one or more components of contextual image system 106, described in additional detail below.

At a high-level, upon receiving an indication to initiate auto-filling objects on canvas, the contextual image system 106 can analyze content associated with an object(s) to select a context-based image(s) for use in filling the object. The contextual image system 106 can also identify placement or positioning of the context-based image(s) within the object such that the selected image(s) is effectively or properly positioned within the object(s).

For cloud-based implementations, the instructions on server 108 may implement one or more components of contextual image system 106, and application 110 may be utilized by a user to interface with the functionality implemented on server(s) 108. In some cases, application 110 comprises a web browser. In other cases, server 108 may not be required. For example, the components of contextual image system 106 may be implemented completely on a user device, such as user device 102a. In this case, contextual image system 106 may be embodied at least partially by the instructions corresponding to application 110.

Thus, it should be appreciated that contextual image system 106 may be provided via multiple devices arranged in a distributed environment that collectively provide the functionality described herein. Additionally, other components not shown may also be included within the distributed environment. In addition, or instead, contextual image system 106 can be integrated, at least partially, into a user device, such as user device 102a. Furthermore, contextual image system 106 may at least partially be embodied as a cloud computing service.

Figure 1B:
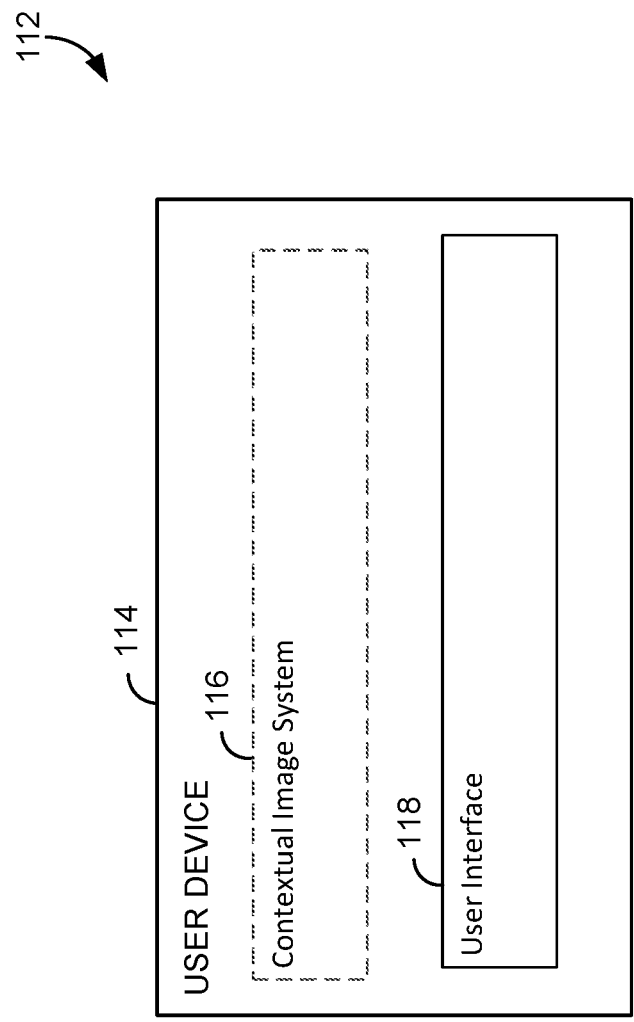
FIG. 1B depicts an example configuration of an operating environment in which some implementations of the present disclosure can be employed, in accordance with various embodiments.

Referring to FIG. 1B, aspects of an illustrative operating environment 112 are shown, in accordance with various embodiments of the present disclosure. FIG. 1B depicts a user device 114, in accordance with an example embodiment, configured to facilitate auto-filling objects on a canvas with automatically selected context-based images. The user device 114 may be the same or similar to the user device 102a-102n and may be configured to support the contextual image system 116 (as a standalone or networked device). For example, the user device 114 may store and execute software/instructions to facilitate interactions between a user and the contextual image system 116 via the user interface 118 of the user device.

A user device can be utilized by a user to facilitate auto-filling objects on a canvas using intelligently selected context-based images. In particular, a user can input an auto-fill indication via a user interface 118. An auto-fill indication can be provided in any number of ways. In some cases, a user may input text onto the canvas and then select to auto-fill the text. In such a case, auto-fill can occur automatically after a user inputs the text. In other cases, a user may select a portion of an object having a predefined boundary for auto-filling. For example, assume an object in the shape of x is presented. In such a case, a user may simply hover over or select a portion of the object and then select to auto-fill. In this way, the object can be auto-filled within the boundary of the object without a user specifying the outline of the object (e.g., via a user selected outline). That is, the object shape to fill is not user defined. Still further, the natural boundary of outer/inner edges of the object can be the predefined boundary (e.g., the letter O has the predefined boundary of an inner oval edge and an outer oval edge such that the space between the inner and outer oval edges can be fillable). Upon receiving the auto-fill indication, one or more images can be selected based on context related to the canvas and used to auto-fill one or more objects. Indications can include clicking on an auto-fill button, using touch screen capabilities, a vocal indication, and/or other methods of user device interaction. Such indications can be carried out using a touch screen, a stylus, a mouse, and/or a track pad. It should be appreciated that while contextual image system is depicted as a single system, in implementations, the functionality of the system can be performed using additional systems.

Figure 3:
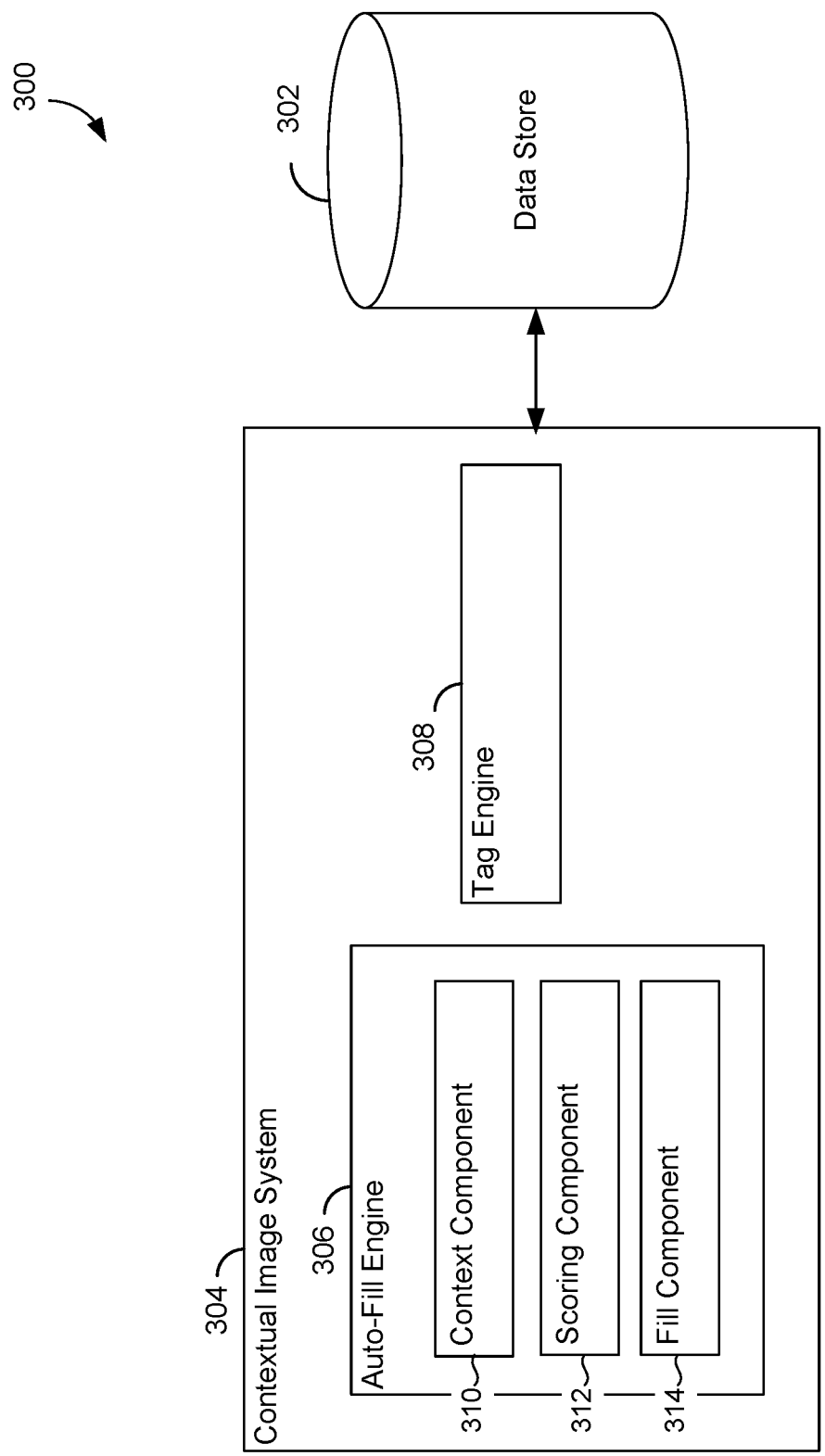
FIG. 3 depicts an example configuration of an operating environment in which some implementations of the present disclosure can be employed, in accordance with various embodiments of the present disclosure.

Referring to FIG. 3, aspects of an illustrative environment 300 are shown, in accordance with various embodiments of the present disclosure. Contextual image system 304 includes auto-fill engine 306 and tag engine 308. The foregoing engines of contextual image system 304 can be implemented, for example, in operating environment 100 of FIG. 1A and/or operating environment 112 of FIG. 1B. In particular, these engines may be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the contextual image system.

As shown, a contextual image system 304 can operate in conjunction with data store 302. Data store 302 can store computer instructions (e.g., software program instructions, routines, or services), data, and/or models used in embodiments described herein. In some implementations, data store 302 can store information or data received via the various engines and/or components of contextual image system 304 and provide the engines and/or components with access to that information or data, as needed. Although depicted as a single component, data store 302 may be embodied as one or more data stores. Further, the information in data store 302 may be distributed in any suitable manner across one or more data stores for storage (which may be hosted externally). In embodiments, data stored in data store 302 can include media (e.g., a user's image catalog, photo catalog, catalog, etc.), context category scoring information, tagging information, etc. Data can be input into data store 302 from a device, such as from a server or a user device, where the device can be remote.

At a high-level, contextual image system 304 can generally be used to facilitate auto-filling objects on a canvas using automatically selected context-based images. Specifically, the contextual image system can determine context based on content related to the canvas. Such content can include a background image, text on the canvas, and/or text entered by a user. In analyzing the content for context, the context can be assigned to a context category, such as, for example, background tags related to a background image, name tags belonging to faces present in a background image and/or recited by text, place tags related to a background image, other tags, etc. As used herein, a context category refers to a category or type of context (e.g., pertaining to where or how the context is identified). Context categories of context tags can be used to score images. For example, scores based on context categories can be used to generate a unique media list of images that can be used for filling the object. Images can generally be construed to include any form of media, such as, photos, videos, clip-art, cartoons, etc. Upon selecting the images for populating the object(s) on the canvas, the images can be intelligently placed.

Auto-fill engine 306 can be used for determining, selecting, and/or placing context-based images to automatically fill objects on a canvas. As depicted, auto-fill engine 306 includes context component 310, scoring component 312, and fill component 314. The foregoing components of auto-fill engine 306 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by a system separate from the contextual image system.

Context component 310 can be used to determine context based on content on a canvas. In this regard, the context component 310 analyzes aspects of the canvas to determine such context. Context can be determined in any number of ways. As one example, context can be determined using tags, such as tags added to content (e.g., image) by a user and smart tags (e.g., tags automatically added to content (e.g., image) based on analysis of the content). In instances that background content, or content outside an object to be filled, is on the canvas, tags related to such background content can be obtained or identified. By way of example only, in a background containing an image of London Bridge, the background might have associated tags "London," "London Bridge," "United Kingdom," and "Summer Trip to London." As can be appreciated, such tags may be user specified tags or automatically generated tags. As another example, a background including a portrait of an individual may have a name tag indicating the particular individual (e.g., "Jane Doe"). Context may also be determined from text within content. Such text may be text in the background content or text on a canvas that is to be or is being filled (e.g., a user-entered word to be filled).

In accordance with determining context, context can be assigned to an appropriate context category. As described, a context category can refer to a category or type of context (e.g., pertaining to where or how the context is identified). Various context categories include, for example, a background, a face, a place, or other categories. In an embodiment where context is determined using tags, the tags can be categorized. For example, tags related to a background image may be categorized as background tags, tags belonging to faces present in a background image and/or recited by text may be categorized as name tags, tags related to images of a place may be categorized as place tags, other tags not falling into a defined category may be categorized as other tags, etc. In this way, tags determined from the background can be categorized as a background tag. Further, if a background is present, faces in the background can be used to determine person(s) related to the background. Identified person(s) can be categorized as a face tag(s).

Determining context can also include determining context from a user-entered word. A user-entered word can generally be a singular word, a term, and/or a phrase. A user-entered word can include text on the canvas that is being filled, a word entered to provide context to a canvas, etc. Context for a word can include categorizing whether the word is a person, place, event, tag, album, etc. This categorization can be performed by searching for the word in the user's database (e.g., face database, album names, event names, tags). If the word is identified as a person, it can be categorized as a face tag. If the word is identified as a place, it can be categorized as a place tag. If the word is something other than a person or place, it can be categorized as an other tag.

Scoring component 312 can be used to score the determined context. Scoring can be used to assign scores to the context determined from the content of the canvas. In some embodiments, context can be scored based on its corresponding context category. Scoring the context based on category can prioritize context more likely to be important to the canvas. For example, when context is determined using tags, the context (e.g., tags) can be assigned scores based on category. For instance, scoring can be implemented such that when a tag is a background photo tag, the tag is multiplied by V, when a tag is a face, the tag is multiplied by X, when a tag is a user-entered word, the tag is multiplied by Y, when the tag is a background tag, a person, and a user-entered work, the tag is multiplied by Z. In an embodiment, a background photo tag (V)=0.10, a face tag (X)=0.20, a user-entered word (Y)=0.60, a background tag, a face tag and a user-entered word (Z)=0.10. Such scoring can be performed for all context of the canvas. When a tag is designated as multiple categories, the scores can be summed (e.g., a user-entered word (0.60) that is also a background tag (0.10) will have a score of 0.70).

In an example embodiment, a user can write "OLIVIA" onto a canvas having a background photo that contains Olivia and her friends Bob, Nick, and Ria. The background image has tags of "Olivia's Birthday", "Birthday", "Olivia", "Party", "Celebration", and "Cake". Such tags can be user generated and/or generated by an auto-tag system. These tags can recognized as "Olivia's Birthday", "Birthday", "Olivia", "Party", "Celebration", and "Cake". Further, faces identified from the background photo can be recognized as "Olivia", "Bob", "Nick", and "Ria". The user-input word can be recognized as "Olivia". Collectively, context can be determined using the tags, identified faces in the background photo, and the user-input word. Such context can be analyzed and categorized such that the context (e.g., tags) is scored based on importance to the canvas. For instance, "Olivia's Birthday", "Birthday", "Olivia", "Party", "Celebration", and "Cake" can be categorized as background tags. "Olivia", "Bob", "Nick" and "Ria" can be categorized as face tags. "Olivia" can be categorized as a user-entered word.

| Tag | Context | Score |
| --- | --- | --- |
| Olivia's Birthday | Background photo tag | 0.10 |
| Birthday | Background photo tag | 0.10 |
| Olivia | Background photo tag, Face name, User-entered word | 0.90 |
| Party | Background photo tag | 0.10 |
| Celebration | Background photo tag | 0.10 |
| Cake | Background photo tag | 0.10 |
| Bob | Face name | 0.20 |
| Nick | Face name | 0.20 |
| Ria | Face name | 0.20 |

Upon completion of scoring, scoring component 312 can create a unique list of tags from the scored tags determined from the content (e.g., scored background tags, face tags, place tags, other tags). In some cases, the scoring component can sort the scored tags and select number of the tags to generate a unique tag list based on the tag scores. For instance, the scored tags can be sorted into ascending order and a number of tags selected from the ordered list. In an embodiment, tags can be selected for the unique tag list when the tag score is over a predefined level (e.g., a score over 0.50). In further embodiments, a predefined number of tags can be selected for the unique tag list (e.g., five tags with the highest scores). In this way, a number of tags relevant to the content of the canvas can be selected for a unique tag list that can be used to facilitate selection of an image(s) to fill an object(s).

Upon selecting tags based on scores, the unique tag list can be used to determine images relevant to the canvas that can be used to fill object(s) on the canvas. In particular, the tags of the unique tag list can be used to identify image(s) having the same/similar tag(s). Similar tags can be tags that are contextually related and/or related to an extent using hierarchy, or probability (e.g., a fishing tag can be similar to a fisherperson tag, a birthday party tag can be similar to a cake tag, etc.). Images can be identified from local and/or remote data stores (e.g., image database, video database, etc.). Identified images can be compiled into a media list. The media list can be comprised of a number of images to fill the object(s) on the canvas. In an embodiment, the media list can be the exact number to images necessary to fill the object(s) on the canvas. In further embodiments, the media list can be comprised of all or some of the images identified based on the unique tag list. An image may refer to any type of image, such as, photos, videos, clip-art, cartoons, etc. The tags of the unique tag list can then be used to identify images with the same/similar context (e.g., indicated via tags) to generate a unique media list that includes images to fill an object(s). For example, when the scored tags indicate the most important/valued context tag relates to "Paris," the identified image(s) can relate to Paris (e.g., an image of the Eiffel tower). As another example, when the scored tags indicate the most valued context tag relates to "Olivia's Birthday," the identified image(s) can relate to Oliva, birthday cake, etc. In this way, the media list can be comprised of a number of images selected using the tags.

Fill component 314 can be used to automatically place an image selected from the media list into an object(s) on the canvas. In embodiments where the media list is comprised of more images than necessary to fill the object(s) of the canvas, a user can indicate preferred images on the media list for use in filling the object(s). Placement of the image by the fill component 314 can include automatically resizing the image based on the width and/or height of a bounding box associated with the object. Placement can further include displaying the image in the object such that the most important/relevant area of the image is visible (e.g., placing face(s) in the image in the center of the bounding box associated with the object or, if no face is present, centering the image in the bounding box).

In an embodiment, an important/relevant area of image can be determined by analyzing the image. For instance, the image can be analyzed using tagged portions to determine whether the image includes a face tag. Face tags of the image can be compared with tags selected based on score (e.g., face tags from a background photo and/or if a user entered word is a face tag). When a face is determined to be present in an image, the image can be panned such that the portion of the image with the face can be placed in the center of the width/height of the letter bounding box such that the face is visible when placed in the object. When no face is found, the image can be placed such that the image is panned to make it the center of the object In an embodiment, the object to be filled can be comprised of text. For example, the object can be text having five letters. Each letter of the text can be filled simultaneously, sequentially, or using another pattern. Fill component can utilize the media list such that a letter from the text can be selected and an image from the media list can be input into the letter. Images can be selected for input into the letters in any manner. For instance, filling can occur by filling the letters in order of the text with images selected in descending order from the media list. As an image is placed into a letter, the image can be automatically resized such that the width and height of the image matches the width and height of the bounding box of the letter. Further, the image can be placed such that the important/relevant area of the image is displayed in the letter.

Tag engine 308 can be used for providing tags for an image based on an analysis of the content of the image. Images can be those added to an image database. For example, the images can be those selected for use in filling an object on a canvas. In an embodiment, the tag engine can automatically provide tags for the images in a user's image database. As images are added to the image database, the tag engine is capable of automatically analyzing and generating tags for the images. In this way, the image tags can be utilized for comparison with tags present on a unique tag list. When tags are the same/similar, an image can be selected and added to media list for use in filling an object on a canvas. Such images can also be used for background content on a canvas such that the tags can be used in generating the unique tag list. The tags can be stored in a database (e.g., data store 302). Tag engine 308 can be implemented, for example, in operating environment 100 of FIG. 1A and/or operating environment 112 of FIG. 1B. Tags generated by the tag engine can be used to select images of the media list such that the selected images are based on context.

Figure 4:
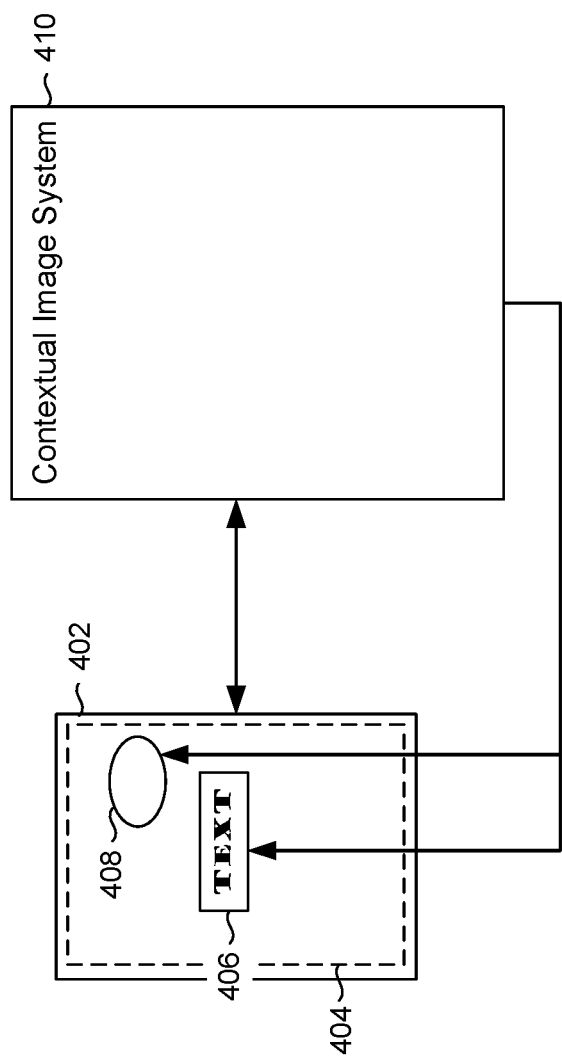
FIG. 4 an illustrative environment for auto-filling objects on a canvas using intelligently selected context-based images, in accordance with embodiments of the present disclosure.

FIG. 4 depicts an illustrative environment for auto-filling objects on a canvas using intelligently selected context-based images, in accordance with embodiments of the present disclosure. As illustrated, canvas 402 is shown. The canvas can be any type of a document, slide, page, etc. As shown, the canvas has background 404. In an embodiment, background 404 can be an image. A canvas can also have objects such as object 406 and object 408. Object 406 can be, for example, text. In embodiments, text can be thought of as one object or comprised of individual letter objects. Object 408 can be, for example, a shape. A user can trigger an auto-fill indication for one or more selected objects on canvas 402. An object can be selected in any manner, for instance, an object can be manually selected by a user or an object can be automatically selected when a user clicks an auto-fill button.

Contextual image system 410 can be used to facilitate auto-filling objects (e.g., object 406 and/or object 408) on a canvas (e.g., canvas 402) using intelligently selected context-based images. Images can generally be construed to include any form of media, such as, photos, videos, clip-art, cartoons, etc. Contextual image system 410 can receive the auto-fill indication, triggering a selection of context-based images to place into the object(s) on the canvas. In embodiments, the selection and placement of context-based images can be automatically performed upon receiving the auto-fill indication. Context-based images can determined by analyzing content related to the canvas. Content can include a background image, text on the canvas, and/or text entered by a user.

In analyzing the content, context of the canvas can be determined by using associated tags. Such tags can include different categories, such as, for example, background tags related to a background image, name tags belonging to faces present in a background image and/or recited by text, place tags related to a background image, other tags, etc. Upon determining context tags associated with the content related to canvas 402, the contextual image system can assign scores to the tags. Scoring can include assigning scores the tags based on category. The scored tags can then be sorted into ascending order such that a number of tags are selected. A tag can be selected if its score is over a predefined level (e.g., a score over 0.50). In further embodiments, a predefined number of tags can be selected (e.g., five tags with the highest scores).

Using the selected tags, a media list comprised of context-based images (e.g., having the same/similar tags as the selected tags) can be determined (e.g., a number of images to fill the object(s) on the canvas). An image may refer to any type of image, such as, photos, videos, clip-art, cartoons, etc. Upon generating the media list, images of the list can be placed into the object(s) on the canvas.

In embodiments, placement of images into the object(s) can be performed automatically and simultaneously (e.g., upon selecting images for placement, the images can be simultaneously and automatically placed into each selected object on the canvas). As an image is placed into an object(s), the image can be resized such that the width and height of the image matches the width and height of a bounding box of the object. Additionally, the important/relevant area of the image can be determined such that the image is placed so that the important/relevant area is displayed. An important/relevant area can include a face, place, etc. that is the same/similar to the context relevant to the canvas (e.g. a canvas about London can have an object filled with a photo of Buckingham Palace such that the building is centered in the object).

Figure 5:
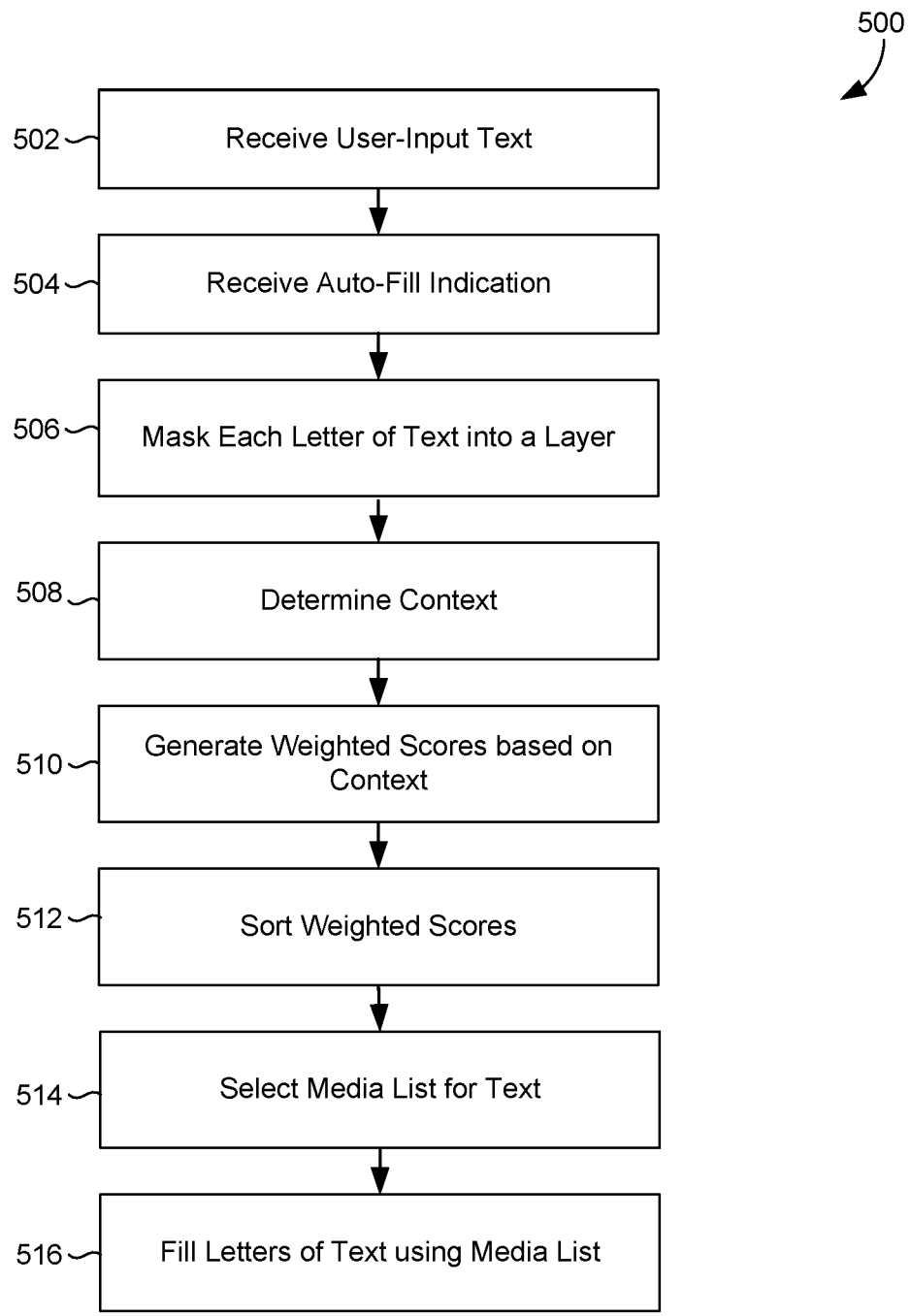
FIG. 5 illustrates a process flow depicting an example of auto-filling an object on a canvas using intelligently selected context-based image(s) using a contextual image system, in accordance with embodiments of the present disclosure.

FIG. 5 illustrates a process flow 500 depicting an example of auto-filling an object on a canvas using intelligently selected context-based image(s) using a contextual image system, in accordance with embodiments of the present disclosure. In one embodiment, at 502, user-input text can be received by a contextual image system. In one embodiment, user-input text can be in the form of text placed onto the canvas. At 504, an auto-fill indication can be received to automatically fill the user-input text on the canvas using context-based images. Such an auto-fill indication can trigger the automatic performance of steps 506-516.

Upon receiving an auto-fill indication, at 506, each letter of the user-input text can be simultaneously masked into a layer. At 508, context relating to the canvas can be determined. Aspects of the canvas can be analyzed to determine such context. Specifically, content related to the canvas can be analyzed to determine the context of the canvas. Determining context can include analyzing a background, if present, applied to the canvas, the user-input text, and/or any other content on the canvas. Tags related to the content can be compiled to generate such context. Tags can include user tags (e.g., tags added to an image by a user) and smart tags (e.g., tags automatically added to an image based on an analysis of the content of the image). For instance, when a background is present, tags related to the background can be retrieved (e.g., a background containing an image of London Bridge, the background might have associated tags "London," "London Bridge," "United Kingdom," and "Summer Trip to London"). Tags determined from the background can be added to a background tag list. Further, if a background is present, faces in the background can be used to determine person(s) related to the background. Identified person(s) can be categorized as a face tag. Context can also be determined from a user-entered word. Context for a word can include determining whether the word is a person, place, event, tag, album, etc. This determination can be performed by searching for the word in a user's database(s) (e.g., face database, album names, event names, tags). If the word is a person, the word can be categorized as face tag. If the word is a place, it can be categorized as a place tag. If the word is something other than a person or place, it can be categorized as an other tag.

At 510, scores can be generated for the tags based on determined context. Scoring the tags can create a unique list of tags from all the context tags determined from content related to the canvas (e.g., from the background tags, face tags, place tags, other tags). Scoring can include assigning scores based on the category of the context tag. For instance, scores can be assigned such that if a tag is a background photo tag, the tag score can be multiplied by V, if a tag is a face name, multiply by X, if a tag is a user-entered word, the tag score can be multiplied by Y, if the tag is a background tag, a face name, and a user-entered work, the tag score can be multiplied by Z. In an embodiment, a background photo tag (V)=0.10, a face name (X)=0.20, a user-entered word (Y)=0.60, a background tag and a face name and a user-entered work (Z)=0.10.

Upon completion of scoring, at 512 the scored tags can be sorted based on score. In an embodiment, the tags can be sorted into ascending order. At 514, a media list can be selected using the scored tags. First, a number of tags can be selected for use in generating the media list. These tags can be used to select media from, for example, a user's database(s) (e.g., image database, video database, etc.). In this way, the media list can be comprised of a number of images selected using the tags. The number of images selected can be based on the number adequate to fill the text on the canvas.

At 516, the selected images can be placed into the text on the canvas. A first letter from the text can be selected and a first image from the media list can be pasted into the letter. As the image is placed into the letter, the image can be resized such that the width and height of the image matches the width and height of the letter bounding box. Further, as the image is placed into the letter, an important/relevant area of the image can be determined such that the important/relevant area is displayed. Names associated with face tags used to select the media list can be determined and then compared with names related to a background, if present, and/or related to a user-entered word. When a face is determined to be present in an image, placement of the image can be manipulated such that the portion of the image with the face can be placed in the center of the width/height of the letter bounding box such that the face is visible in the object. When no face is found, the image can be placed such that the image is panned to make it the center of the object. This process can be performed simultaneously for each letter of the user-entered text.

Figure 6:
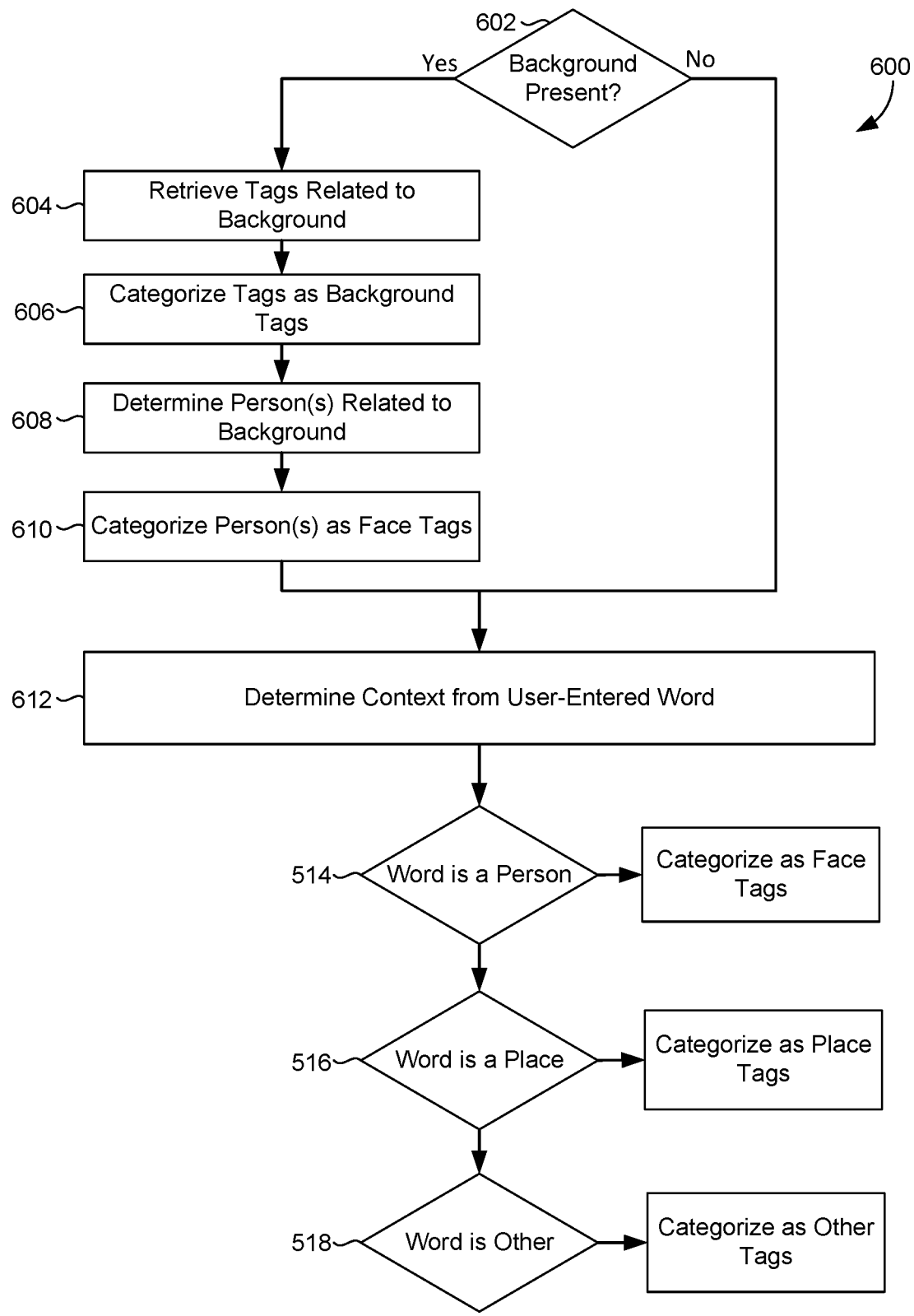
FIG. 6 illustrates a process flow depicting an example determining context of a canvas for use in selecting context-based images for automatic placement into object(s) on the canvas, in accordance with embodiments of the present invention.

FIG. 6 illustrates a process flow 600 depicting an example determining context of a canvas for use in selecting context-based images for automatic placement into object(s) on the canvas, in accordance with embodiments of the present invention.

At block 602, a contextual image system can determine whether a background is present on a canvas. In embodiments, such a background can be an image. If it is determined that a background is present, then the process can progress to 604 where tags related to the background are retrieved (e.g., tags for the image used for the background). At 606, the retrieved tags can be categorized as background tags. At 608, person(s) related to the background can be determined. At 606, the retrieved tags for the person(s) can be categorized as face tags. If it is determined that no background is present, then the process moves to 612.

At 612, context can be determined from a user-entered word. Such a user-entered word can be text on the canvas, and/or text entered by a user in response to a canvas context query. A canvas content query can ask a user to input a word and/or phrase describing the context of the canvas (e.g., "London," "Olivia's Birthday Party," "Spring Break," etc.). Context for a word can include determining whether the word is a person, at 614, a place, at 616, or other, at 618. This determination can be performed by searching for the word in the user's database (e.g., face database, album names, event names, tags). If the word is a person the word can be categorized as a face tag. If the word is a place, the word can be categorized as a place tag. If the word is something other than a person or place, the word can be categorized as an other tag.

Figure 7:
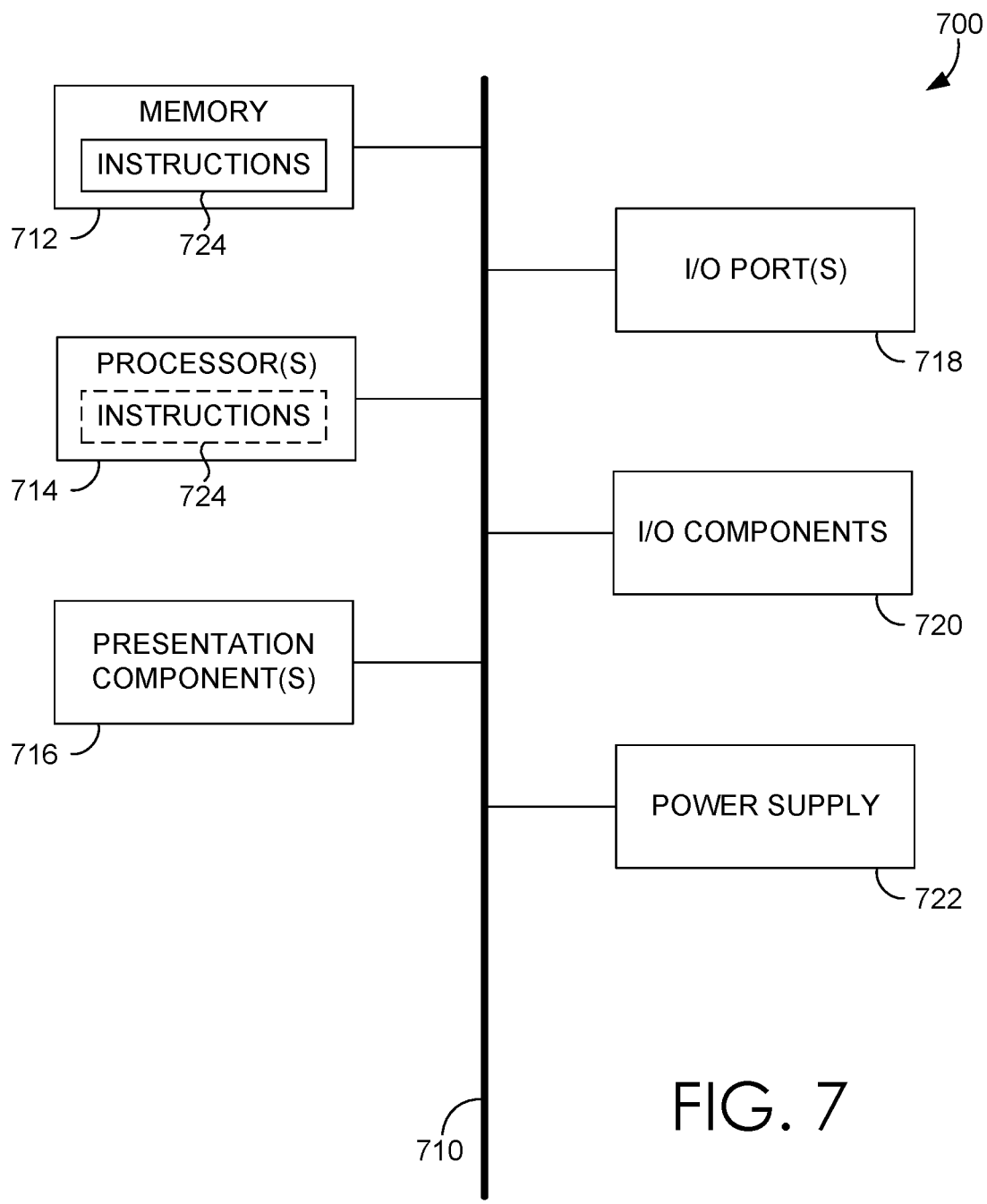
FIG. 7 is a block diagram of an example computing device in which embodiments of the present disclosure may be employed.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
receiving an indication to auto-fill an object on a canvas, wherein the object has a predefined boundary utilized to fill the object with one or more images;
analyzing a background image of the canvas to determine a context of the canvas;
determining a set of ranked tags from the context of the canvas;
identifying, based on the set of ranked tags from the context of the canvas, an image to fill the object; and
filling the object with the image within the predefined boundary of the object.

2. The computer-implemented method of claim 1, wherein the context of the canvas is further based on analyzing one or more of text associated with the canvas and a user-input word related to the canvas.

3. The computer-implemented method of claim 1, the determining the context for the canvas further comprising:
retrieving a first set of tags related to a user-input word related to the canvas, wherein the first set of tags comprises a face tag, a place tag, or another tag.

4. The computer-implemented method of claim 3, further comprising:
retrieving a second set of tags related to a background of the canvas, wherein the second set of tags comprises a background tag, or another face tag; and
identifying the set of ranked tags based on respective tag category weights associated with the first set of tags and the second set of tags.

5. The computer-implemented method of claim 1, wherein receiving the indication to auto-fill the object on the canvas comprises receiving a set of text characters and a selection to auto-fill the text characters.

6. The computer-implemented method of claim 1, wherein receiving the indication to auto-fill the object on the canvas comprises receiving a selection of a portion of the object within the predefined boundary.

7. The computer-implemented method of claim 1, wherein the predefined boundary outlines the object on the canvas without user interaction to define the predefined boundary.

8. The computer-implemented method of claim 1, wherein filling the object further comprises placing the image into the object such that a relevant area of the image is visible.

9. A non-transitory computer-readable storage medium including instructions which, when executed by a computer, cause the computer to perform operations comprising:
receiving an indication to auto-fill an object on a canvas;
based on a background image of the canvas and a user-input word related to the canvas, determining a set of ranked tags of a context for the canvas;
selecting, based on the set of ranked tags of the context, a plurality of images; and
filling the object using an image of the plurality of images.

10. The non-transitory computer-readable storage medium of claim 9, further comprising:
retrieving a first set of tags related to the user-input word related to the canvas, wherein the first set of tags comprises a face tag, a place tag, or another tag; and
retrieving a second set of tags related to a background of the canvas, wherein the first set of tags comprises a background tag or another face tag.

11. The non-transitory computer-readable storage medium of claim 10, further comprising:
identifying the set of ranked tags based on respective tag category weights associated with the first set of tags and the second set of tags.

12. The non-transitory computer-readable storage medium of claim 9, wherein the context for the canvas comprises a predefined number of tags related to the canvas.

13. The non-transitory computer-readable storage medium of claim 9, wherein filling the object further comprises:
placing the image into the object such that a relevant area of the image is visible.

14. The non-transitory computer-readable storage medium of claim 13, wherein the relevant area is a face, the face being placed at a center of a bounding box associated with the object.

15. The non-transitory computer-readable storage medium of claim 13, wherein the relevant area is a place, a tagged portion of the image related to the place being placed at a center of a bounding box associated with the object.

16. A non-transitory computer-readable storage medium including instructions which, when executed by a computer, cause the computer to perform operations comprising:
receiving an indication to auto-fill an object on a canvas, wherein the object has a predefined boundary utilized to fill the object with one or more images;
analyzing a background image of the canvas to determine a context of the canvas;
determining a set of ranked tags from the context of the canvas;
identifying, based on the set of ranked tags from the context of the canvas, an image to fill the object; and
filling the object with the image within the predefined boundary of the object.

17. The non-transitory computer-readable storage medium of claim 16, further comprising:
placing the image into the object such that a relevant area of the image is visible.

18. The non-transitory computer-readable storage medium of claim 17, wherein the relevant area comprises a face, the face being placed at a center of a bounding box associated with the object.

19. The non-transitory computer-readable storage medium of claim 17, wherein the relevant area is not a face, the image being centered in a bounding box associated with the object.

20. The non-transitory computer-readable storage medium of claim 17, wherein the context of the canvas comprises a background of the canvas or a user-input word related to the canvas.

* * * * *